United States Patent [19]

Rice

[11] Patent Number: 4,798,766
[45] Date of Patent: Jan. 17, 1989

[54] SURFACE MODIFIED CLAYS AND PROCESS OF MANUFACTURE

[75] Inventor: Camilla A. Rice, Sandersville, Ga.

[73] Assignee: E.C.C. America Inc., Atlanta, Ga.

[21] Appl. No.: 89,510

[22] Filed: Aug. 26, 1987

Related U.S. Application Data

[63] Continuation-in-part of Ser. No. 943,669, Dec. 17, 1986, Pat. No. 4,789,403, which is a continuation-in-part of Ser. No. 887,320, Jul. 22, 1986, abandoned, and a continuation-in-part of Ser. No. 933,083, Nov. 20, 1986, Pat. No. 4,690,868, which is a continuation-in-part of Ser. No. 699,014, Feb. 8, 1985, abandoned.

[51] Int. Cl.$^4$ .................. B32B 5/16; C23C 16/00
[52] U.S. Cl. .................. 428/404; 106/417; 106/418; 106/457; 106/468; 106/487; 106/469; 427/221; 427/248.1; 427/255; 428/407; 428/409; 523/205; 523/209; 524/789
[58] Field of Search ........... 428/407, 405, 409, 402, 428/404; 427/213, 221, 248.1, 255; 523/205, 209; 524/789; 106/308 N, 308 R, 308 B

[56] References Cited

U.S. PATENT DOCUMENTS 3,773,708 11/1973 Takahashi et al. .................. 523/209
4,472,538 9/1984 Kamigaito et al. ............. 523/205 X

OTHER PUBLICATIONS

M. F. Savchits et al., "High Temperature Amination of the Surface of Oxide Catalysts", Mar. 7, 1979, pp. 1–7.

Primary Examiner—Thomas J. Herbert
Attorney, Agent, or Firm—Stefan J. Klauber

[57] ABSTRACT

A method is described in which a layered lattice silicate is surface modified with an organic material by reacting said layered lattice silicate in particulate form with a reactant system comprising gaseous $NH_3$ at temperatures below about 1000° C. and contacting the aminated silicate in particulate form with an organic compound selected from the group of monomers, co-monomers, prepolymers and compounds condensable with the amine group, such as a nylon precursor, in the presence of gaseous hydrogen. The surface modified silicates are useful as fillers in a filled polymer system comprising a matrix polymer and a filler.

27 Claims, No Drawings

SURFACE MODIFIED CLAYS AND PROCESS OF MANUFACTURE

RELATED APPLICATIONS

This application is a continuation-in-part of U.S. Ser. No. 933,083, filed Nov. 20, 1986, now U.S. Pat. No. 4,690,868, which is a continuation-in-part of Ser. No. 699,014, filed Feb. 8, 1985, now abandoned; and of Ser. No. 943,669, filed Dec. 17, 1986, now U.S. Pat. No. 4,789,403, which is a continuation-in-part of Ser. No. 887,320, filed July 22, 1986, now abandoned.

FIELD OF THE INVENTION

This invention relates generally to clay and clay minerals, including layered lattice silicates such as kaolins.

BACKGROUND OF THE INVENTION

In a prior patent application, U.S. Ser. No. 933,083, filed Nov. 20, 1986, Applicant described a method for aminating materials of this type to produce products having new and unusual properties, rendering same useful for a variety of purposes, including as fillers in plastic, rubber and other systems. These products can also be more generally regarded as intermediates for subsequent functionalization.

In a further patent application, U.S. Ser. No. 943,669, filed Dec. 17, 1986, Applicant disclosed a method for producing a layered lattice silicate which is surface modified with an organic material, by contacting the silicate (such as a kaolin) with an organic monomer, co-monomers, or a prepolymer, and effecting surface polymerization in situ in the presence of a gaseous hydrogen atmosphere.

It has now been found that aspects of these two processes can be combined to produce a yet further filler clay having unusual and highly desirable properties, e.g. as a filler for plastics.

The invention is applicable to layered silicates of the type which can be represented by the general formula $E_iM_xSi_yO_n(OH)_m$ where M is Al, Mg, or Fe, $x=2$ to 6; $y=2$ to 8, $n=2$ to 20, $m=0$ to 8, and $E_i$ is one or more exchangeable ions (K, Na, Mg, Ca, Ba, Fe, Li, etc.).

In a 1979 article by the Soviet authors Savchits, Romanovskii, and Egiazrov, entitled "High Temperature Amination of the Surface of Oxide Catalysts", it is reported that the surface hydroxyl groups of high surface area aluminosilicate catalysts can be replaced by surface bound $NH_2$ groups via a high temperature gas stage reaction with ammonia. This reference is concerned with examining those conditions under which ammonia does not modify the surface of the catalysts, and has no applicability to layered crystalline mineral materials such as the clay materials that are of primary interest to the present invention.

In accordance with the foregoing, it may be regarded as an object of the present invention, to provide new types of surface modified layered lattice silicate pigments, which are totally and directly compatible with the polymer systems to which they may be added as fillers, and which when so used provide outstanding improvements in the mechanical and other useful properties of the filled system.

It is also an object of the invention to provide a method of surface modification of layered lattice silicates in which improved bonding of modifier to the silicate surface is achieved.

It is a further object of the invention to provide a relatively simple, and effective process, for preparing the aforementioned surface modified pigments from layered lattice silicates, such as aluminosilicates, and which enables preparation of such products with a wide variety of compatibility characteristics for use in desired polymer matrices.

It is a yet further object of the present invention, to provide a process and products, which enable the production of filled systems, for example, resin-filled systems, incorporating the products of the invention, which have superior properties with respect to mechanical aspects of same, as compared to prior art filled systems based upon prior art kaolin clay, and similar fillers.

SUMMARY OF THE INVENTION

Now in accordance with the present invention, the foregoing objects, and others as will become apparent in the course of the ensuing specification, are achieved in a method for directly aminating the surface of a layered lattice silicate, such as a clay mineral surface, comprising reacting the said clay mineral in substantially dry particulate form with a reactant system capable of forming bound $NH_2$ groups at said surface; and contacting the aminated silicate in substantially dry particulate form with an organic monomer, co-monomers or a prepolymer, or an organic compound condensable with the amine group to release water or a halogen compound, typically a hydrogen halide, in the presence of gaseous hydrogen.

The amination reaction is typically conducted at temperatures below about 1000° C., e.g. from about 150° to 1000° C. A preferred temperature range is from about 700° C. to 900° C. Lower temperatures, e.g. to as low as 150° C., may be utilized, but as the temperature approaches the low value indicated, the $NH_2$ surface concentration obtained may become too low for certain applications.

The composition to be treated may be reacted with ammonia gas. Although not required, this mixture may include as well an inert gas carrier, such as nitrogen or argon, and/or a reducing gas such as CO.

The reaction may be conducted in various apparatus capable of effecting good contact between the reactant gases and the particulate solids. The said reaction may e.g. be conducted in a rotary furnace, or in a fluidized bed reactor with the gaseous components passing upwardly through a suitable diffuser plate, and into a fluidized bed of the particulate material being treated. Typical reaction times are from about 2 to about 45 minutes, depending upon concentration of the reactants and temperatures. Longer reaction times may also be utilized. The quantity of ammonia utilized is preferably such as to provide at least about 0.06% of nitrogen on the clay by weight, following the amination.

Thus the aminated silicate which is in substantially dry particulate form, is contacted with an organic monomer, co-monomers, or a prepolymer, viz., not fully polymerized to its highest molecular weight range, and surface reaction or polymerization is effected in the presence of a gaseous hydrogen atmosphere. The level of addition of the monomers/prepolymers may suitably be in the range of about 0.25 weight percent to about 10 weight percent based on the weight of the silicate. The aminated feed such as a refined kaolin, is initially blended with a solid or liquid monomer (or, as mentioned, co-monomers or a prepolymer), as for example, by milling of the dry kaolin and a dry monomer in a suitable mill, which may also be screened. The resulting powder is thereupon provided in a suitable reactor, which has previously been heated to an intermediate temperature, for example, 100° C. The reactor is flushed with nitrogen to remove residual oxygen and thereupon a flow of hydrogen is substituted for the nitrogen. The hydrogen need not be pure and may contain inert constituents. Heat is then provided to increase the temperature to at least the melting point of the monomer, but insufficient to volatilize the monomer, while the hydrogen atmosphere is maintained. The temperatures are generally under about 350° C., e.g., in the range of about 125° C. to less than 350° C., typically being of the order of 150° to 250° C. for representative monomers, or somewhat lower.

The said reaction may be conducted in apparatus which provides good gas-solids contact, such as a rotary furnace. The said reaction may also be conducted in a fluidized bed reactor, with the gaseous components passing upwardly through a suitable diffuser plate, and into a fluidized bed of the particulate material being treated. Typical reaction times are from about 5 to 45 minutes, depending upon concentration and composition of the reactants and temperature, although longer reaction times can be utilized.

If a fluidized bed is used, after the reaction is completed, for example, in 25 minutes, the heating source is removed from the reactor and the unit allowed to cool to about 100° C. while the hydrogen atmosphere is maintained, and thereafter the hydrogen is replaced by a flow of nitrogen, upon which the reactor is allowed to cool down and the product removed.

The resultant products find various applications and are particularly useful as fillers in resin or plastic systems, where same are found to considerably increase the useful mechanical properties of the said systems, such as toughness, adhesion properties, and the like, as will be further seen in the Examples to be set forth in this application.

Various layered lattice silicates, including minerals comprising same, may be treated by the method of the invention. Thus, for example, clays of the halloysites, illite, kaolinite, montmorillonite, palygorskite groups, talc, mica, wollastonite, and various other clays, can be readily treated by the present invention.

A large variety of organic reagents may be used in the process of the invention. The reagents for the aminated clays are preferably amino acids, dicarboxylic acids and monofunctional or difunctional organic acids. For example, there may be used the lactam of heptanoic acid, E-caprolactam or alternatively 6-amino caproic acid, or 11-amino undecanoic acid or other amino acids, and dicarboxylic acids such as adipic acid and sebacic acid, e.g., dicarboxylic acids of the general formula HOOC(CH$_2$)$_x$COOH where x is an integer from 1 to 8. It will be apparent that other monomers, co-monomers, prepolymers and organic compounds condensable with the amino group, may be used to produce various nylon types or urethanes.

In connection with the Examples, certain compounds with their formulas, which are interrelated, are shown below:

adipic acid 
HO—C(CH$_2$)$_4$COOH 6-amino caproic acid 
NH$_2$(CH$_2$)$_5$C—OH E-caprolactam 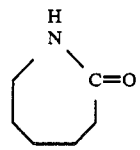

nylon 6  H—[NH(CH$_2$)$_5$CO]$_{\overline{n}}$OH nylon 6, 6  H—[NH(CH$_2$)$_6$NHCO(CH$_2$)$_4$CO]$_{\overline{n}}$OH It will be noted that the first stage product already contains NH$_2$ groups surface bonded to the clay so that the second stage will employ organic reagents reactive with NH$_2$. Therefore the second stage organic reagents are not required to contain amine groups although such may be present; they should contain groups reactive with amines such as carboxyl, halocarboxyl, halogen, and halosulfonyl wherein the halogen is preferably chlorine—in each instance being linked to a hydrocarbon moiety which may or may not be substituted by an inert group—which groups provide the potential for condensation via elimination of water or hydrogen halide, or other halogen compound, and polymerization. It is believed that reaction in situ on the clay takes place to make the latter useful as fillers for resin matrices, in particular matrices of a resin similar to or compatible with the product formed on the silicate particles via a condensation polymerization process. In general, the fillers of this invention may be used with a resin matrix of a type that is compatible with nylon polymers, urethane polymers or polyester polymers. Thus, besides the just mentioned nylon precursors, other reagents that react with NH$_2$ may alternatively be employed, as shown below:

$$\text{—NH} + \text{RCOCl} \longrightarrow \text{HCl} + \text{—NHC—R} \quad (1)$$
(with H on N, O double bonded to C)

$$\text{—NH} + \text{RX} \longrightarrow \text{HX} + \text{—NHR} \quad (X = \text{Halogen}) \quad (2)$$

$$\text{NH} + \text{C}_6\text{H}_5\text{SO}_2\text{Cl} \xrightarrow{\text{NaOH}/\text{H}_2\text{O}} \text{C}_6\text{H}_5\text{SO}_2\text{NR}_2 \quad (3)$$

Urethanes may also be formed by reaction with the amine group with alkyl chloroformates.

$$\text{—NH} + \text{ClCOOR} \longrightarrow \text{—NHCOOR} + \text{HCl} \quad (4)$$

DETAILED DESCRIPTION

The invention will now be illustrated by the Examples, which, however, are to be considered as merely exemplary of practice of the invention, and not as delimitive thereof.

Example I

In one embodiment of the present invention, a hydrous or uncalcined kaolin was employed as starting material, viz., an air-classified kaolin 82% of the particles by weight of which were less than 2 micrometers E.S.D. (equivalent spherical diameter) and having a surface area of 20 square meters per gram, which sample was first treated by amination. More specifically, the said kaolin was aminated by treatment with gaseous ammonia at 800° C. for 20 minutes in a rotary furnace. This product is termed herein "NH$_2$-clay".

The said NH$_2$-clay was then milled with 2% adipic acid. This was effected twice in order to assure good mixing, although the repeat procedure is not necessary. The mixture was then fed into a rotary furnace and reacted at 225° C. for 20 minutes in a hydrogen atmosphere.

The treated product was washed with acetone and water. Its drift spectra was examined and showed no shift or broadening upon washing, indicating that a true reaction had occurred. After reaction, the spectra showed the formation of amide bonds at 3400 cm$^{-1}$ and 1600 cm$^{-1}$ region.

The product of the procedure outlined, i.e., the aminated clay reacted with the adipic acid, was used as a filler at a 40% filler level in a nylon 6,6 (Vydyne 21X, product of Monsanto). This was compared with a prior art product TRANSLINK 445 from Engelhard which is a 1% amino silane treated calcined kaolin, both being used in the filled system. The filled system based upon the product of the invention exhibited superior properties in modulus, heat distortion temperature (HDT), and tensile strength as shown in Table 1 below.

TABLE 1

| Filler | Tensile Strength | Modulus × 10$^5$ psi | HDT °C. at 264 psi |
|---|---|---|---|
| Product of Invention | 9290 | 5.65 | 163° C. |
| Prior Art TL 445 | 8470 | 4.31 | 156° C. |

Example II

The clay feed was a waterwashed kaolin blend with a psd (particle size distribution) of 72% less than 2 micrometers E.S.D. after treatment at 700° C.

The intermediate was prepared by treating the kaolin at 700° C. in a rotary furnace in a pure NH$_3$ atmosphere. The flow rate of the NH$_3$ was 10 SCFH (stanrdard cubic feet per hour). There was a net increase in the nitrogen content of 0.36% as determined by elemental analysis. The intermediate is herein termed "NH$_2$-clay." The same clay treated in air at 700° C. showed a nitrogen content of 0.025%.

The NH$_2$-clay was milled with 1% 6-amino caproic acid (6ACA) and treated in the rotary furnace in a pure H$_2$ atmosphere [15 SCFH flow rate] at 245° C. for 18–25 minutes. The time is not particularly critical since these are surface reactions that take place quite rapidly. The resulting product showed the formation of

bonds in the 1600 and 3400 cm$^{-1}$ infrared region using diffuse reflectance infrared spectroscopy. The resulting product had a final nitrogen content of 0.40% and a carbon content of 0.50%. This product is termed "NH$_2$+6ACA".

Example III

A similar product was produced from the NH$_2$-clay using 1% adipic acid

with these reaction conditions: temperature 190° C.; H$_2$ at 15 SCFH flow rate for approximately 20–25 minutes' reaction time.

This product showed a nitrogen content of 0.35% (unchanged from the NH$_2$-clay intermediate) plus an increase in carbon content of 0.55%. This product is termed "NH$_2$+adipic acid."

Products "NH$_2$+6ACA" and "NH$_2$+adipic acid" were used as fillers at a 40% filler level in a nylon 6/66 blend, and tested along with Translink 445 and the NH$_2$-clay. It should be noted that Translink 445 is based on a fully calcined kaolin product, Whitetex.

TABLE 2

| Filler | Tensile Strength (psi) | Flex Modulus × 10$^5$ psi | HDT° C. at 264 psi |
|---|---|---|---|
| TL445 | 11,248 | 7.5 | 143 |
| NH$_2$-clay | 9,955 | 7.9 | 150 |
| NH$_2$+ adipic acid | 10,225 | 8.5 | 155 |
| NH$_2$+ 6ACA | 10,466 | 8.5 | 157 |
| MR409* | 10,880 | 7.6 | 150 |

*MR409 is a mineral reinforced commercially filled nylon from Wellman Inc.

It is evident from these results that the NH$_2$ organic treated partially calcined kaolin offers a 100,000 psi advantage in flex strength and a 12° to 14° C. advantage in heat distortion temperature. These are excellent results.

It should be noted that the data in Table 1 was generated by passing the polymer through a twin screw extruder twice. The polymer has been exposed to temperature degradation twice, and this is reflected in the low physical properties values. The data in Table 2 was generated by the polymer being filled in a single pass through the twin screw extruder. The physical properties reflect this also. The values in Table 2, however, are in the range that the polymer industry would expect.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

I claim:

1. A particulate layered lattice silicate having the general formula E$_i$M$_x$Si$_y$O$_n$(OH)$_m$ where M is Al, Mg, or Fe, x=2 to 6, y=2 to 8, n=2 to 20, m=0 to 8, and E$_i$ is one or more exchangeable ions, the surfaces of which have been modified by surface bound NH$_2$ groups and further reacted with an organic compound selected from the class consisting of monomers, co-monomers, and prepolymers which are condensible with the amine group.

2. The composition of claim 1, in which said layered lattice silicate is a kaolin.

3. The composition of claim 1, in which said layered lattice silicate is a mica.

4. The composition of claim 1, in which said layered lattice silicate is a talc.

5. The composition of claim 1, in which said layered lattice silicate is a bentonite.

6. The composition of claim 1 in which the organic compound is selected from the class consisting of amino acids, dicarboxylic acids, monofunctional acids and difunctional acids.

7. The composition of claim 1, in which the organic compound is a nylon precursor.

8. The composition of claim 1, in which the organic compound is selected from the class consisting of 6-amino caproic acid, E-caprolactam, adipic acid and 11-amino undecanoic acid.

9. A method of producing a layered lattice silicate which is surface modified with an organic material, which comprises reacting a layered lattice silicate having the general formula $E_iM_xSi_yO_n(OH)_m$ where M is Al, Mg, or Fe; $x=2$ to 6, $y=2$ to 8, $n=2$ to 20, $m=0$ to 8, and $E_i$ is one or more exchangeable ions, in particulate form with a reaction system comprising gaseous $NH_3$ at temperatures below about 1,000° C. to form bound $NH_2$ groups at said surface, and reacting the aminated silicate in particulate form in the presence of gaseous hydrogen with an organic compound selected from the class consisting of monomers, co-monomers, and prepolymers, which are condensible with the amine group.

10. A method according to claim 9, in which said layered lattice silicate is a kaolin.

11. A method according to claim 9, in which said layered lattice silicate is a mica.

12. A method according to claim 9, in which said layered lattice silicate is a talc.

13. A method according to claim 9, in which said layered lattice silicate is a bentonite.

14. A method according to claim 9 in which the organic compound is selected from the class consisting of amino acids, dicarboxylic acids, monofunctional acids and difunctional acids.

15. A method according to claim 9 in which the organic compound is a nylon precursor.

16. A method according to claim 9 in which the organic compound is selected from the class consisting of 6-amino caproic acid, E-caprolactam, adipic acid and 11-amino undecanoic acid.

17. A method according to claim 9, wherein the amination reaction is carried out at temperatures in the range of from about 150° C. to 1000° C. and the further treatment in the presence of gaseous hydrogen is carried out at temperatures in the range of about 125° C. to less than 350° C.

18. A method according to claim 9, wherein the amination reaction is carried out at temperatures in the range of from about 700° C. to 900° C. and the further treatment in the presence of gaseous hydrogen is carried out at temperatures in the range of about 125° C. to about 250° C.

19. A filled resin system comprising a resin matrix and a filler, said filler comprising particles of a layered lattice silicate having the general formula $E_iM_xSi_yO_n(OH)_m$ where M is Al, Mg, or Fe, $x=2$ to 6, $y=2$ to 8, $n=2$ to 20, $m=0$ to 8, and $E_i$ is one or more exchangeable ions, the surfaces of which have been modified by surface bound $NH_2$ groups and further reacted with an organic compound selected from the class consisting of monomers, co-monomers, and prepolymers which are condensible with the amine group.

20. The composition according to claim 19 in which the organic compound is selected from the class consisting of amino acids, dicarboxylic acids, monofunctional acids and difunctional acids.

21. A composition according to claim 19 in which the organic compound is a nylon precursor.

22. A composition according to claim 19 in which the organic compound is selected from the class consisting of 6-amino caproic acid, E-caprolactam, adipic acid and 11-amino undecanoic acid.

23. A composition according to claim 19, in which the matrix resin is compatible with nylon polymers, urethane polymers or polyester polymers.

24. A composition according to claim 19, in which the layered lattice silicate is a kaolin.

25. A composition according to claim 19, in which the layered lattice silicate is a mica.

26. A composition according to claim 19, in which the layered lattice silicate is a talc.

27. A composition according to claim 19, in which the layered lattice silicate is a bentonite.

* * * * *